US009438338B1

(12) United States Patent
Chan et al.

(10) Patent No.: US 9,438,338 B1
(45) Date of Patent: Sep. 6, 2016

(54) SYSTEM FOR BIDIRECTIONAL FREE-SPACE LASER COMMUNICATION OF GIGABIT ETHERNET TELEMETRY DATA

(71) Applicant: The Boeing Company, Chicago, IL (US)

(72) Inventors: Eric Yuen-Jun Chan, Mercer Island, WA (US); Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 14/684,748

(22) Filed: Apr. 13, 2015

(51) Int. Cl.
*H04B 10/00* (2013.01)
*H04B 10/11* (2013.01)
*H04B 10/112* (2013.01)

(52) U.S. Cl.
CPC ............ *H04B 10/11* (2013.01); *H04B 10/112* (2013.01); *H04B 10/1129* (2013.01)

(58) Field of Classification Search
CPC .. H04B 10/00; H04B 10/11; H04B 10/1129; H04B 10/112; H04B 10/1121; H04B 10/1123; H04B 10/1125; H04B 10/1127
USPC ................. 398/118, 121, 124, 125
See application file for complete search history.

(56) References Cited

U.S. PATENT DOCUMENTS

| | | | |
|---|---|---|---|
| 6,285,481 B1 | 9/2001 | Palmer | |
| 7,197,248 B1 | 3/2007 | Vorontsov et al. | |
| 7,230,227 B2* | 6/2007 | Wilcken ............ | H04B 10/1121 250/208.2 |
| 7,343,099 B2 | 3/2008 | Wirth et al. | |
| 7,457,545 B2* | 11/2008 | Wirth ................ | H04B 10/1125 250/201.9 |
| 7,761,009 B2 | 7/2010 | Bloom | |
| 8,041,224 B2* | 10/2011 | Shpantzer ........... | H01L 27/1446 398/115 |
| 8,301,032 B2* | 10/2012 | Majumdar .............. | G01S 17/74 398/129 |
| 8,355,635 B1 | 1/2013 | Liu et al. | |
| 8,478,127 B2 | 7/2013 | Chan et al. | |
| 9,312,954 B2* | 4/2016 | Chen ................. | H04B 10/1143 |

OTHER PUBLICATIONS

Chan et al., "Application of COTS High Speed 980 nm Pump Laser Diode and Driver for Free Space Laser Communication Terminal," Proc. of SPIE, vol. 3708, pp. 79-86, Apr. 1999.
Chan et al., "Application of COTS High Power Laser Diodes and Driver for Free Space Laser Communication Terminal," Proc. of SPIE, vol. 3266, pp. 54-67, Jan. 1998.
Saint Clair et al., "Optical Communications Receiver Array," Atmospheric Propagation VII, Proc. of SPIE, vol. 7685, 2010.

* cited by examiner

*Primary Examiner* — M. R. Sedighian
(74) *Attorney, Agent, or Firm* — Ostrager Chong Flaherty & Broitman P.C.

(57) ABSTRACT

A free-space laser communication system for bidirectional transmission of telemetry data in Gigabit Ethernet (GBE) protocol using a dual atmospheric effect mitigation approach. This free-space bidirectional GBE laser communication system utilizes an Optical Combining Receiver Array and a Framer/Forward Error Correction/Interleaver (FFI) device to mitigate the combined effects of atmospheric turbulence and channel fading. Since the FFI device is designed for Synchronous Optical Network (SONET) protocol, an intelligent (or smart) media converter is used to convert GBE telemetry data to SONET frames, which enables the FFI device to perform an error correction algorithm and provide a seamless error-free GBE laser communication link for distance over a kilometer. This bidirectional laser communication system can be implemented with low-cost commercially available components.

20 Claims, 5 Drawing Sheets

SYSTEM FOR BIDIRECTIONAL FREE-SPACE LASER COMMUNICATION OF GIGABIT ETHERNET TELEMETRY DATA

BACKGROUND

This disclosure generally relates to free-space laser communication systems. More particularly, this disclosure relates to free-space atmospheric laser communication systems having error control circuitry.

Telemetry is an automated communications process by which measurements are made and other data collected at remote or inaccessible points and transmitted to receiving equipment for monitoring. For example, it is known to acquire telemetry data onboard an aircraft and then transmit that data to a receiver on the ground in response to telecommands from the ground. One existing solution uses a radio-frequency (RF) link to transmit telemetry data between an airplane and a ground station. The drawbacks of using an RF link include a low data rate and vulnerability to electromagnetic interference.

Free-space atmospheric laser optical communication systems transmit and receive information by means of light beams that propagate through the atmosphere. The benefits of using a free-space optical communication link instead of the existing RF link include at least the following: higher-speed telemetry data transmission and the free-space optical signal is not affected by electromagnetic interference.

Free-space laser optical communication is a viable solution for a long-distance (>1 km) telemetry link between an aircraft and a ground station because the technologies embodied in high-data-rate transmitters, high-power optical amplifiers and high-sensitivity receivers are mature and commercially available. However, there are three major problems for optical transmission of telemetry data: (1) Free-space laser communication has an atmospheric turbulence effect which causes optical beam wander between the transmitter and receiver locations. (2) Optical signals in free space experience a fading effect which is caused by destructive interference of reflected signals from other objects in the free space to the receiver. As a result of destructive interference, the optical signal at the receiver experiences loss of signal bits or generates erroneous signal bits in a digital optical data stream. (3) Without a standard for free-space high-speed optical communication, popular Gigabit Ethernet (GBE) protocol is preferable for high-speed telemetry data. This may cause an incompatibility problem with existing laser communication equipment designed for a high-speed Synchronous Optical Network (SONET) protocol. Problems (1) and (2) are inherent problems of free-space optical communication; problem (3) is an optical system component design issue.

The present disclosure is directed toward free-space laser communication systems capable of addressing one or more of the aforementioned problems.

SUMMARY

The subject matter disclosed in detail below is directed to a free-space laser communication system for bidirectional transmission of telemetry data in GBE protocol using a dual atmospheric effect mitigation approach. This free-space bidirectional GBE laser communication system utilizes an optical communications receiver array (OCRA) and a framer/forward error correction/interleaver (FFI) device to mitigate the effects of atmospheric turbulence (e.g., beam wander caused by random inhomogeneities in the atmosphere's local index of refraction) and channel fading (e.g., destructive interference of reflected signals from other objects in the free space to the receiver). Since the FFI device is designed for SONET protocol, an intelligent (or smart) media converter is used to convert SONET frames into GBE telemetry data and vice versa, which enables the FFI device to perform an error correction algorithm and provide a seamless error-free GBE laser communication link for distance over a kilometer. This bidirectional laser communication system can be implemented with low-cost commercially available (i.e., off-the-shelf) components.

The free-space laser communication system disclosed in detail below solves the three problems discussed in the Background section by using the OCRA to mitigate the atmospheric turbulent effect on the beam and the FFI device to mitigate the fading effect. The third problem is addressed by using a commercially available intelligent small form-factor pluggable (SFP) transceiver to convert the GBE data into a SONET OC-3 optical data stream (i.e., having an optical carrier transmission rate of up to 155.52 Mbit/s) to be processed by the FFI device.

As used herein, the term "optical connection" includes, but is not limited to, any connection comprising one optical fiber or other waveguide or two or more optical fibers or other waveguides connected in series by one or more connectors. In the embodiments disclosed in detail below, all optical fibers are single-mode fibers.

One aspect of the subject matter disclosed in detail below is a system comprising: an array of lenses; an optical communications receiver array that is optically coupled to the array of lenses and configured to convert light impinging on the array of lenses into differential electrical signals; a regenerator configured to convert the differential electrical signals into regenerated optical signals formatted in accordance with a specified networking protocol; an error correction subsystem configured to convert the regenerated optical signals from the regenerator into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream; a media converter configured to convert optical signals transmitted by the error correction subsystem into electrical signals in GBE format representing the corrected data bit stream; and a data processor programmed to process electrical signals in GBE format received from the media converter. In the disclosed embodiments, the specified networking protocol is Synchronous Optical Networking, while the data processor is a telemetry processor that transmits Ethernet frames at a rate of at least one gigabit per second. The system further comprises a telescope configured to direct impinging free-space optical signals onto the array of lenses.

Another aspect of the subject matter disclosed in detail below is a communication system comprising: first and second telescopes; a first data processor programmed to transmit electrical signals in GBE format representing a data bit stream; a first media converter configured to convert electrical signals in GBE format received from the first data processor into optical signals at one wavelength formatted in accordance with a specified networking protocol to represent the transmitted data bit stream; a wavelength converter configured for converting optical signals received from the first media converter at the one wavelength into optical signals at another wavelength; an optical amplifier for amplifying the optical signals at the other wavelength; an optical connection which carries the amplified optical signals to the first telescope; a first array of lenses located to receive light from the second telescope; a first optical communications receiver array that is optically coupled to the first array of lenses and configured to convert light impinging on the first array of lenses into differential electrical signals; a first regenerator configured to convert the differential electrical signals into regenerated optical signals formatted in accordance with the specified networking protocol; a first error correction subsystem configured to convert the regenerated optical signals from the first regenerator into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream; a second media converter configured to convert the corrected optical signals from the first error correction subsystem into electrical signals in GBE format representing the corrected data bit stream; and a second data processor programmed to process electrical signals in GBE format received from the second media converter. This communication system may further comprise: a second array of lenses located to receive light from the first telescope; a second optical communications receiver array that is optically coupled to the second array of lenses and configured to convert light impinging on the second array of lenses into differential electrical signals; a second regenerator configured to convert the differential electrical signals from the second optical communications receiver array into regenerated optical signals formatted in accordance with the specified networking protocol; and a second error correction subsystem configured to convert the regenerated optical signals from the second regenerator into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream, wherein the first media converter is configured to convert the corrected optical signals from the second error correction subsystem into electrical signals in GBE format representing the corrected data bit stream. In addition, the communication system may comprise: a first bandpass filter placed between the first telescope and the second array of lenses and having a center at a first wavelength; and a second bandpass filter placed between the second telescope and the first array of lenses and having a center at a second wavelength different than the first wavelength.

A further aspect is a system comprising: a telescope; a plurality of lenses arranged to receive optical signals from the telescope; a plurality of photodetectors for converting optical signals received by the lenses into electrical signals; electronic circuitry configured to convert the electrical signals from the photodetectors into regenerated optical signals formatted in accordance with a specified networking protocol; an error correction subsystem configured to convert the regenerated optical signals into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream; a media converter configured to convert the corrected optical signals into electrical signals in GBE format representing the corrected data bit stream; and a data processor programmed to process electrical signals in GBE format received from the media converter.

Yet another aspect of the disclosed subject matter is a method for communicating data between data processors using optical signals that propagate through an atmosphere, comprising: (a) transmitting a data bit stream in the form of electrical signals in GBE format from a first data processor; (b) converting the electrical signals in GBE format received from the first data processor into optical signals formatted in accordance with a specified networking protocol to represent the transmitted data bit stream; (c) transmitting the optical signals produced in step (b) from a first telescope through the atmosphere; (d) receiving the optical signals transmitted by the first telescope at a second telescope; (e) converting the optical signals received by the second telescope into electrical signals; (f) converting the electrical signals produced in step (e) into regenerated optical signals formatted in accordance with the specified networking protocol; (g) converting the regenerated optical signals into electrical signals representing a data bit stream; (h) performing forward error correction on electrical signals produced in step (g) to produce electrical signals representing a corrected data bit stream; (i) converting the electrical signals representing the corrected data bit stream into optical signals formatted in accordance with the specified networking protocol to represent the corrected data bit stream; (j) converting the optical signals produced in step (i) into electrical signals in GBE format representing the corrected data bit stream; and (k) receiving the electrical signals in GBE format representing the corrected data bit stream at a second data processor.

Other aspects of systems and methods for free-space laser communication of telemetry data are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Various embodiments of systems for free-space laser communication of GBE telemetry data will now be described in detail for the purpose of illustration. At least some of the details disclosed below relate to optional features or aspects, which in some applications may be omitted without departing from the scope of the claims appended hereto.

Figure 1:
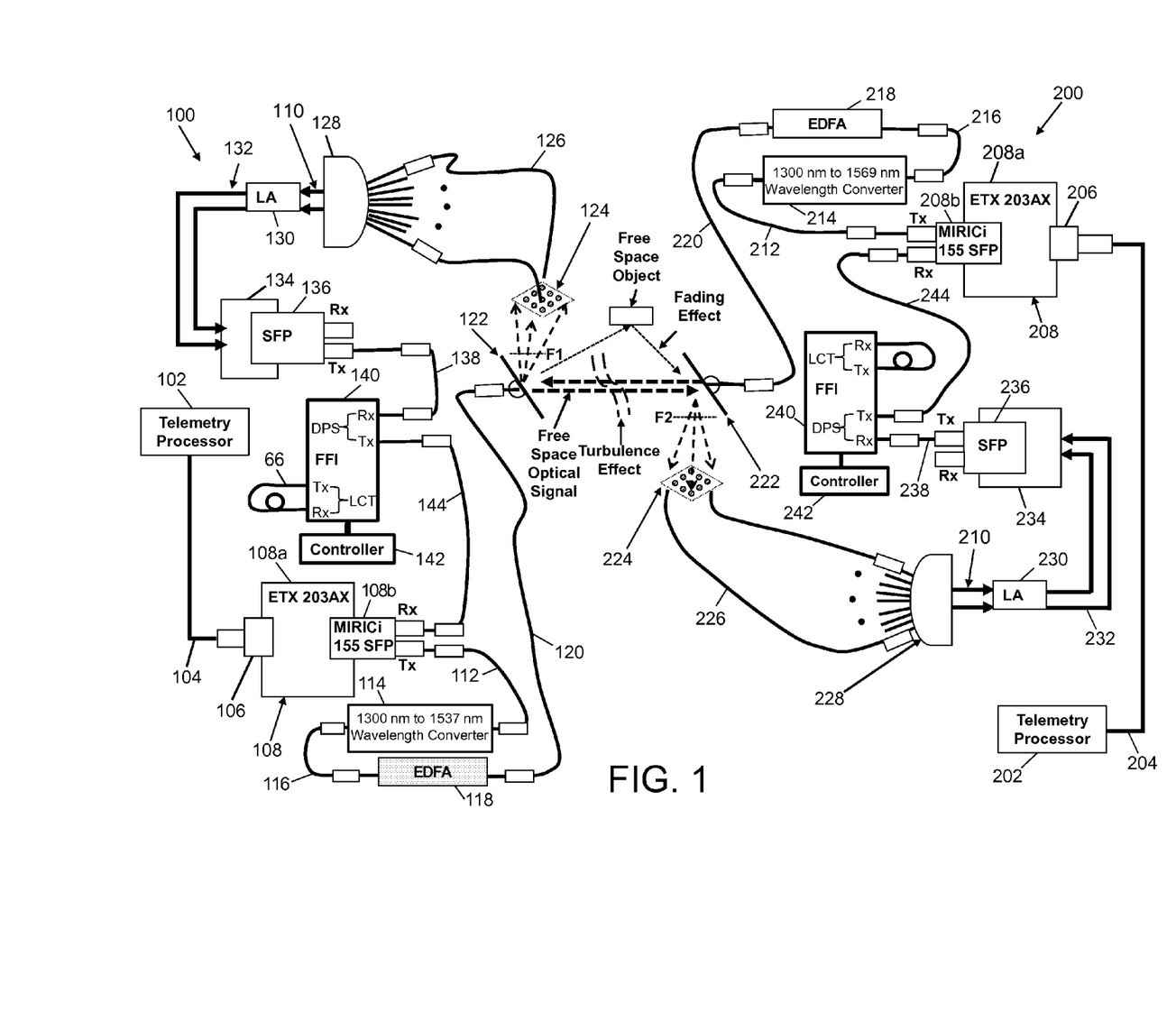
FIG. 1 is a block diagram showing components of a bidirectional free-space laser communication system for GBE telemetry data in accordance with one embodiment, which system uses a combined OCRA/FFI dual atmospheric mitigation technique.

FIG. 1 shows components of a bidirectional free-space laser communication system for GBE telemetry data in accordance with one embodiment. The system depicted in FIG. 1 comprises a first laser communication system 100 on the ground and a second laser communication system 200 onboard a mobile platform, such as an aircraft. However, a person skilled in the art will recognize that the laser communication systems 100 and 200 could be situated on respective aircraft, enabling air-to-air communication.

Still referring to FIG. 1, laser communication system 100 comprises a pointing/tracking/acquisition (PTA) telescope 122, while laser communication system 200 comprises a PTA telescope 222. Each of the PTA telescopes 122 and 222 comprises an optical telescope assembly mounted on a gimbal assembly. Typically, the pointing, acquisition and tracking system uses two-axis gimbals for coarse pointing control to an accuracy of several hundred micro-radians and a fast steering mirror for fine track control to maintain pointing to within micro-radians. As depicted by bold dashed arrows in FIG. 1, the telescopes are capable of transmitting and receiving free-space optical signals through the atmosphere. The effect of turbulence in the atmosphere is indicated in FIG. 1 by a pair of dashed wavy lines. FIG. 1 also shows a free-space object in the atmosphere which has produced a fading effect during transmission of a free-space optical signal from PTA telescope 122 and reception of the faded signal by PTA telescope 222. This fading effect is represented by a pair of dotted arrows in FIG. 1, one arrow indicating an optical signal from the PTA telescope 122 which impinged on the free-space object and the other arrow indicating an optical signal reflected by the free-space object toward the PTA telescope 222.

Before describing the functioning of the laser communication systems 100 and 200, their various components and connections will be described.

The PTA telescope 122 of laser communication system 100 directs free-space optical signals received from laser communication system 200 to an optical receiver. The optical receiver of laser communication system 100 comprises a micro-lens array 124, a bandpass optical filter F1 installed on the micro-lens array 124, and an optical communications receiver array (OCRA) 128 having respective photodetectors (not shown in FIG. 1) optically coupled to the respective micro-lenses of the micro-lens array 124 by means of respective optical connections 126.

The photodetectors of OCRA 128 are followed by an electrical analog summing-amplifying network (not shown in FIG. 1), yielding a single differential output 110 which is coupled to a limiting amplifier (LA) 130. The outputs of the limiting amplifier 130 are connected by coaxial cables 132 to the inputs of a regenerator 134 which regenerates the optical signals and outputs the regenerated optical signals via an SFP transceiver 136 (which may be considered a component of the regenerator 134). The SFP transceiver 136 formats the regenerated optical signals in accordance with a specified networking protocol. In a preferred implementation, that specified networking protocol is the SONET protocol. The transmitter of the SFP transceiver 136 is optically coupled by an optical connection 138 to a receiver of a digital processing subsystem (DPS) SFP transceiver (not shown in FIG. 1, but discussed later with reference to FIG. 5) incorporated in a framer/forward error correction/interleaves (FFI) device 140. In addition, a transmitter of a laser communication terminal (LCT) SFP transceiver (not shown in FIG. 1, but discussed later with reference to FIG. 5) of the FFI device 140 is optically coupled to a receiver of the same LCT SFP transceiver by an optical connection 66. The FFI device 140 operates under the control of a controller 142. A transmitter of the DPS SFP transceiver of the FFI device 140 is optically coupled to a receiver (indicated by "Rx" in FIG. 1 and other drawings) of an SFP transceiver 108a of a media converter 108 by an optical connection 144. The media converter 108 further comprises an Ethernet demarcation device 108a which is electrically coupled to a telemetry processor 102 by means of Category 6 Ethernet cable 104 and an RJ45 connector 106. A transmitter (indicated by "Tx" in FIG. 1 and other drawings) of the SFP transceiver 108a of the media converter 108 is optically coupled by an optical connection 112 to a wavelength conversion device 114, which converts the optical signal from the media converter 108 to a longer wavelength. The wavelength conversion device 114 is in turn optically coupled to an erbium-doped fiber amplifier (EDFA) 118 by means of an optical connection 116. Finally, the EDFA 118 is optically coupled to the PTA telescope 122 by means of an optical connection 120.

Similarly, the PTA telescope 222 of laser communication system 200 directs free-space optical signals received from laser communication system 100 to an optical receiver. The optical receiver of laser communication system 200 comprises a micro-lens array 224, a bandpass optical filter F2 installed on the micro-lens array 224, and an OCRA 228 having respective photodetectors (not shown in FIG. 1) optically coupled to the respective micro-lenses of the micro-lens array 224 by means of respective optical connections 226.

The photodetectors of the OCRA 228 are followed by an electrical analog summing-amplifying network (not shown in FIG. 1), yielding a single differential output 210 which is coupled to a limiting amplifier 230. The outputs of the limiting amplifier 230 are connected by coaxial cables 232 to the inputs of a regenerator 234 which regenerates the optical signals and outputs the regenerated optical signals via an SFP transceiver 236 (which may be considered a component of the regenerator 234). The SFP transceiver 236 formats the regenerated optical signals in accordance with a specified networking protocol. In a preferred implementation, that specified networking protocol is the SONET protocol. The transmitter of the SFP transceiver 236 is optically coupled to a receiver of a digital processing subsystem (DPS) SFP transceiver (not shown in FIG. 1) incorporated in a FFI device 240 (which may have a construction identical to FFI device 140) by an optical connection 238. In addition, a transmitter of a laser communication terminal (LCT) SFP transceiver (not shown in FIG. 1, but discussed later with reference to FIG. 5) of the FFI device 140 is optically coupled to a receiver of the same LCT SFP transceiver by an optical connection 66. The FFI device 240 operates under the control of a controller 242. A transmitter of the DPS SFP transceiver of the FFI device 240 is optically coupled to a receiver of an SFP transceiver 208b of a media converter 208 by an optical connection 244. The media converter 208 further comprises an Ethernet demarcation device 208a which is electrically coupled to a telemetry processor 202 by means of Category 6 Ethernet cable 204 and an RJ45 connector 206. A transmitter of the SFP transceiver 208a of the media converter 208 is optically coupled by an optical connection 212 to a wavelength conversion device 214, which converts the optical signal from the media converter 208 to a longer wavelength. The wavelength conversion device 214 is in turn optically coupled to an erbium-doped fiber amplifier (EDFA) 218 by means of an optical connection 216. Finally, the EDFA 218 is optically coupled to the PTA telescope 222 by means of an optical connection 220.

In accordance with the implementation depicted in FIG. 1, the media converter 108 consists of an ETX-203AX carrier Ethernet demarcation device 108a and a MiRICi-155 SFP converter 108b, while the media converter 208 consists of an ETX-203AX carrier Ethernet demarcation device 208a and a MiRICi-155 SFP converter 208b. These components are both commercially available from RAD Data Communications, Inc., Mahwah, N.J. In the same implementation, the FFI devices were manufactured by Efficient Channel Coding, Inc., Cuyahoga Heights, Ohio.

Figure 2:
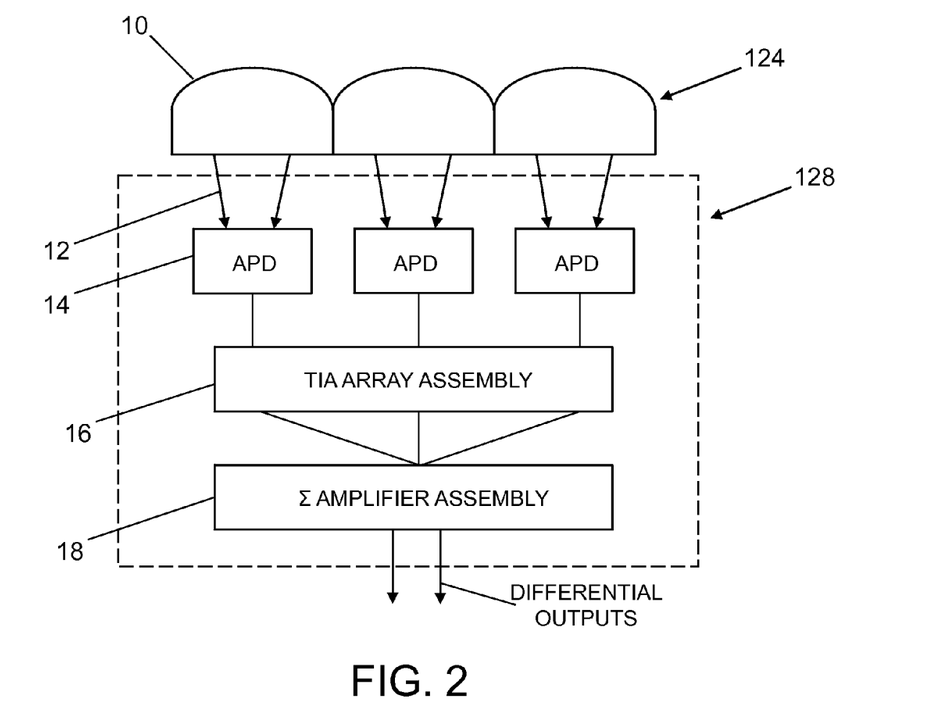
FIG. 2 is a block diagram showing an optical receiver architecture in accordance with one implementation of the system depicted in FIG. 1.

In accordance with the implementation depicted in FIG. 1, micro-lens arrays 124 and 224 each have nine micro-lenses arranged in a 3×3 array, and OCRAs 128 and 228 each have nine receive channels respectively optically coupled to the nine micro-lenses of the corresponding micro-lens array. FIG. 2 shows the optical receiver architecture for laser communication system 100. The optical receiver architecture for laser communication system 200 may be identical.

FIG. 2 shows three of the nine micro-lenses 10 of the micro-lens array 124. To minimize losses, the configuration shown in FIG. 2 couples light from the micro-lens array 124 directly onto an array of avalanche photodiodes (APD) 14 which serve as photodetectors. Respective optical fibers 12 are used to couple light from each micro-lens 10 into the corresponding avalanche photodiode 14. This can be accomplished using a collimating fiber array that is terminated in fiber-optic connectors. The output of each avalanche photodiode 14 is connected to the input of a respective trans-impedance amplifier (TIA) of a TIA array assembly 16. Each APD/TIA pair forms a respective APD receiver of the OCRA 128. The analog photocurrents output from the APD receivers are incoherently summed using electronic summing amplifiers of a summing amplifier assembly 18. The summing amplifier assembly 18 combines the electrical outputs of the APD receivers into a pair of electrical differential output signals.

The laser communication systems 100 and 200 each use a combined OCRA/FFI dual atmospheric mitigation technique which will now be described in detail with reference to FIG. 1. For the purpose of illustration, a process whereby telemetry data is sent from laser communication system 100 on the ground to laser communication system 200 onboard an aircraft will now be described.

On the left side of FIG. 1, it shows a telemetry processor 102 on the ground station. The telemetry processor 102 is transmitting and receiving electrical GBE data through the Category 6 Ethernet cable 104 to and from the media converter 108, which converts the electrical GBE signal into SONET OC-3 optical signal. In the implementation shown in FIG. 1, the media converter 108 has a 1300-nm laser. The wavelength conversion device 114 is used to convert the optical signal to a wavelength of 1537 nm. The 1537-nm optical signal is input to EDFA 118 to amplify the signal to multi-watt output range (typical output power is 37 dBm, >4 Watts). The EDFA 118 operates in a wavelength range of 1500 to 1600 nm. Therefore, the wavelength conversion device 114 is needed to input the optical signal from the transmitter of the SFP transceiver 108b of the media converter 108 to the EDFA 118. The amplified output of EDFA 118 is coupled to the PTA telescope 122 to transmit the 1537-nm optical signal through free space to the PTA telescope 222 of a mobile platform (e.g., an airplane). The optical signal transmitted through free space will have effects due to atmospheric turbulence and due to fading as shown in the middle of FIG. 1. The effect of atmospheric turbulence causes optical beam wander, which reduces the signal photons being received by the mobile platform.

The laser communication system 200 shown in FIG. 1 uses a high-sensitivity OCRA configuration to retain the signal photons which would be lost due to beam wander. As previously described, the OCRA setup has an array of closely spaced micro-lenses to receive the free-space optical signal from the PTA telescope. As the beam wanders due to turbulence, the spread out signal photons are collected by the micro-lens array. Each micro-lens array is connected to a high-sensitivity avalanche photodiode (APD) receiver on the OCRA board. In the example of FIG. 1, there are nine micro-lenses in micro-lens array 224 with nine APD receivers in the associated OCRA board. Each APD receiver has a sensitivity of −33 dBm. This provides a free-space optical power budget of at least 70 dB with the EDFA output power at 37 dBm.

The optical signals from micro-lens array 224 are coupled to the APD receivers of the OCRA 228. The OCRA 228 combines the electrical outputs of the APD receivers into a pair of electrical differential output signals. The differential output signals from OCRA 228 are connected to a limit amplifier 230 which conditions the OCRA differential output to a sufficient amplitude and wave shape to drive the differential transmitter inputs of a regenerator 234. The regenerator 234 includes a standard commercial off-the-shelf SFP transceiver 236. The regenerated optical signal from the transmitter (indicated by "Tx" in FIG. 1) of the SFP transceiver 236 is input to the DPS receiver of FFI device 240. Upon receiving the optical signal from the regenerator 234, the FFI device 240 performs the clock and data recovery, using the recovered clock and data signals to drive the transmitter of an LCT SFP transceiver (which is part of the FFI device 240). As shown in FIG. 1, the optical signal from the LCT transmitter is looped back to the LCT receiver. The FFI device 240 performs the error correction algorithm for missing bits and/or any erroneous bits in the data stream which was transmitted through free space (as shown in the middle of FIG. 1). The corrected bit stream then goes through another clock and data recovery circuit to reshape the waveform in SONET OC-3 format to drive the DPS transmitter in the FFI device 240. The DPS transmitter output transmits the optical signal through optical connection 244 (using single-mode fiber) to the receiver of the media converter 208, which converts the SONET OC-3 signal to GBE data to communicate with the GBE telemetry processor 202 (on the right side in FIG. 1).

In a similar process, the telemetry processor 202 onboard the aircraft can communicate with the telemetry processor 102 on the ground station through the free-space optical link as indicated in the middle of FIG. 1, so the communications between telemetry processors 102 and 202 are bidirectional, which means free-space optical signals can be both transmitted and received at the same time. This is also called duplex operation. To minimize the crosstalk on the micro-lens arrays, a respective narrow-band bandpass optical filter is installed on the each micro-lens array to filter out the transmitter signal produced by the associated EDFA. As indicated in FIG. 1, the wavelength conversion device 214 (onboard the aircraft) generates a 1569-nm optical signal to the input of EDFA 218, whereas the wavelength conversion device 114 (on ground station) generates a 1537-nm optical signal to the input of EDFA 118. Therefore, the two free-space optical signals have a wavelength difference of 32 nm. The bandpass optical filter F1 (installed on micro-lens array 124) has a bandwidth of about 4 nm and a center wavelength at 1569 nm, whereas the narrow-band bandpass optical filter F2 (installed on micro-lens array 124) has a bandwidth of about 4 nm and a center wavelength at 1537 nm, Since the center wavelengths of the two filters are separated by 32 nm and their bandwidths are 4 nm, any crosstalk of optical signals from their associated EDFA optical outputs on the respective micro-lens arrays can be eliminated because filter F1 transmits optical signals from EDFA 218 and filters out optical signals from EDFA 118, while filter F2 transmits optical signals from EDFA 118 and filters out optical signals from EDFA 218.

While the OCRA mitigates the beam wander effect due to atmospheric turbulence, the effect of signal fading (which is due to destructive interference of the optical signal by signal-reflecting objects in the atmosphere) is mitigated by the FFI device. In addition, each ETX-203AX/MiRICi 155 media converter 108, 208 is a commercial off-the-shelf intelligent (or smart) transceiver which has a special clock rate synchronization mechanism to convert electrical GBE signals to SONET OC-3 optical signals at a rate of 155 Mbit/s and vice versa. An ETX-203AX/MiRICi 155 media converter enables the telemetry processor to communicate with the FFI device, which is designed for SONET data protocol. The ETX-203AX/MiRICi 155 setup is designed for a standard telecom OC-3 data rate, which has a low-cost mass market for local area networks. The free-space laser communication systems disclosed herein take advantage of this feature. The ETX-203AX/MiRICi 155 media converter interfaces with the FFI device directly to achieve the GBE optical link for the telemetry processor. This is feasible because the FFI device has an internal clock and data recovery system which operates with the SONET data rate at multiples of 155 Mbit/s. The FFI device is designed to correct optical signal errors due to the fading effect. When missing or erroneous bits occur in a free-space optical data stream due to the fading effect, the FFI device is equipped with an algorithm to fill in the missing bits or correct the erroneous bits in the optical data stream and re-transmit the corrected optical signal through its optical output port via single-mode fiber. But the FFI devices require SONET signal to operate. They will not be functional with GBE input data format due to clock rate incompatibility between GBE and SONET. Using the ETX-203AX/MiRICi 155 intelligent media converter overcomes this problem and provides error-free GBE free-space optical link operation for the telemetry processor.

Figure 3:
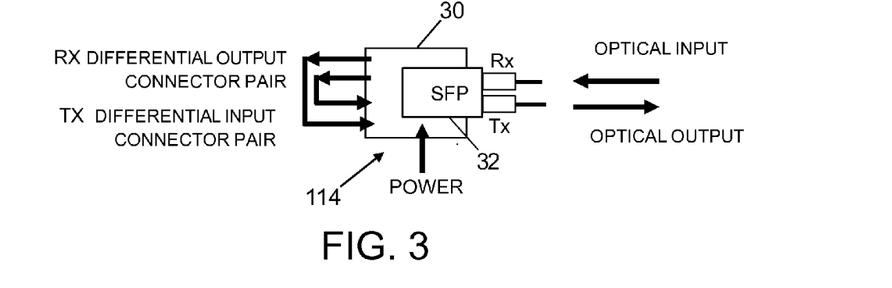
FIG. 3 is a block diagram showing the construction of one type of wavelength conversion device which can be incorporated in the system depicted in FIG. 1.

FIG. 3 shows one construction of a low-cost wavelength conversion device. Although the wavelength conversion device 114 is described with reference to FIG. 3, it should be appreciated that the construction of wavelength conversion device 214 (see FIG. 1) may be the same.

In accordance with the implementation depicted in FIG. 3, the wavelength conversion device 114 comprises a commercial off-the-shelf SFP transceiver 32 mounted on a printed circuit board (PCB) 30 with two pairs of differential electrical connectors (not shown on PCB 30) and a DC power connector (not shown on PCB 30) for the SFP transceiver 32. The electrical signal on the differential output connector pair of the receiver is connected to the differential input connector pair of the transmitter. As the 1300-nm optical signal is coupled to the receiver of the SFP transceiver 32, the receiver output drives the transmitter input. The transmitter of the SFP transceiver 32 is equipped with either a 1537-nm laser (in the case of wavelength conversion device 114) or a 1569-nm laser (in the case of wavelength conversion device 214). The SFP transceiver 32 outputs the modulated optical signal to the input of the EDFA 118 (or 218) seen in FIG. 1. The wavelength conversion devices are used because the transmitter of transceiver 208b (or 108b) operates at 1300 nm wavelength and the EDFAs operate in the 1500 to 1600 nm wavelength range with maximum gain and efficiency.

Figure 4:
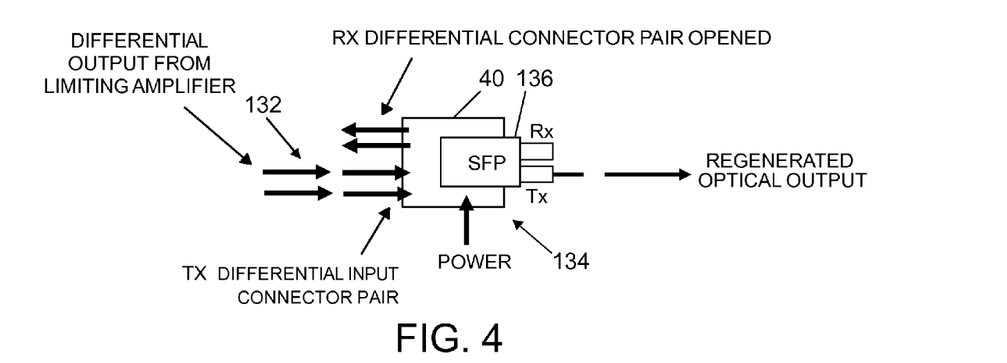
FIG. 4 is a block diagram showing the construction of one type of optical signal regenerator which can be incorporated in the system depicted in FIG. 1.

FIG. 4 shows the construction of a low-cost regenerator which is similar to the design of the wavelength converter seen in FIG. 3. Although the regenerator 134 is described with reference to FIG. 3, it should be appreciated that the construction of regenerator 234 (see FIG. 1) may be the same.

In accordance with the implementation depicted in FIG. 4, the regenerator 134 comprises a commercial off-the-shelf SFP transceiver 136 on a PCB 40 with two pairs of differential electrical connectors (not shown on PCB 40) and a DC power connector (not shown on PCB 40) for the SFP transceiver 136. The differential outputs of limiting amplifier 130 (or 230) (see FIG. 1) are connected to the transmitter input differential connector pair. The receiver output differential connectors are left open without connection. When the SFP transceiver 136 (or 236) is powered up and the differential output signal from the limiting amplifier 130 (or 230) of the OCRA 128 (or 228) (see FIG. 1) is applied to the differential input, the OCRA input signal is regenerated as optical output by the transmitter of the SFP transceiver 136 (or 236). The wavelength of the regenerated signal depends on the choice of laser in the transmitter of the SFP transceiver 136. A wavelength range from 1300 nm to 1600 nm is compatible with the DPS receiver of the FFI device 140 (and 240).

Figure 5:
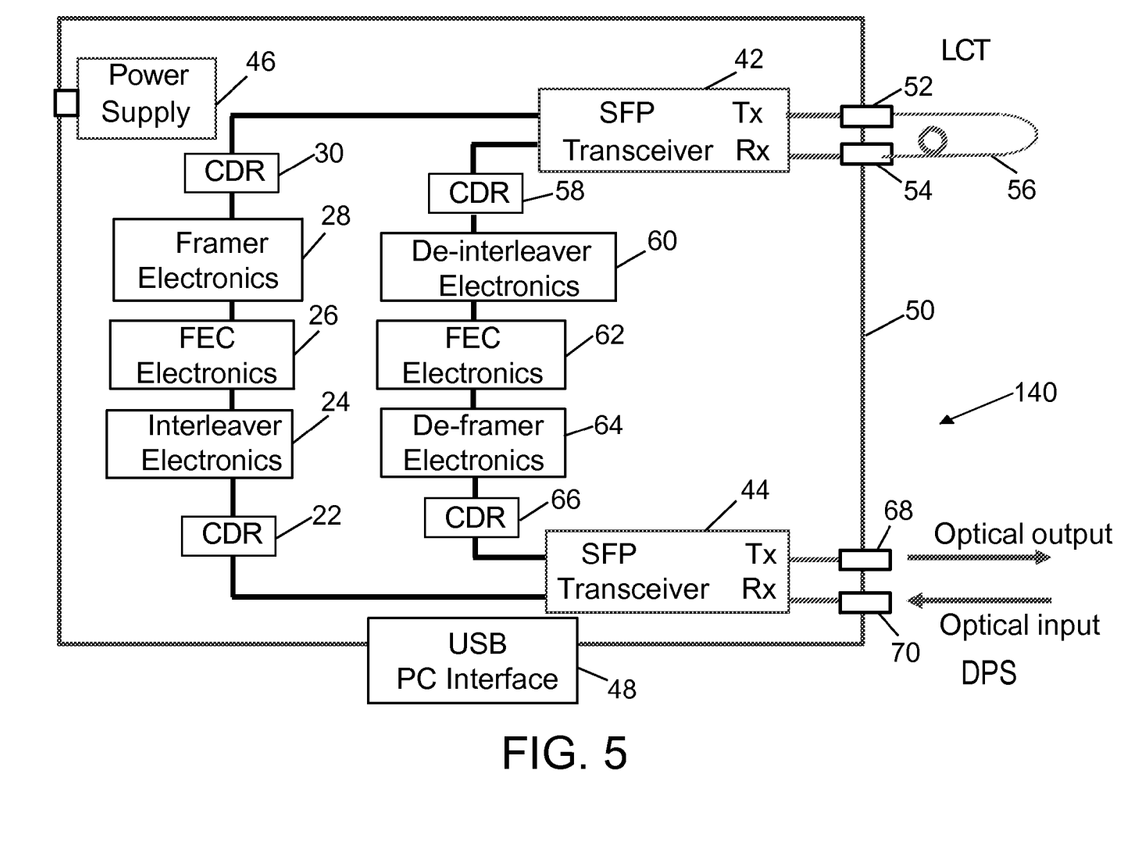
FIG. 5 is a hybrid diagram showing some hardware components and the functionality of the framer/forward error correction/interleaver device incorporated in the system depicted in FIG. 1.

FIG. 5 shows some hardware components and the functionality of other electronic circuitry of the FFI device 140 incorporated in the system depicted in FIG. 1. Although the FFI device 140 is described with reference to FIG. 5, it should be appreciated that the construction of FFI device 240 (see FIG. 1) may be the same.

In accordance with the implementation depicted in FIG. 5, the FFI device 140 comprises a pair of commercial off-the-shelf SFP transceivers 42 and 44 mounted on a PCB 50 along with a power supply 46 and a USB PC interface 48. As previously described, the FFI device 140 performs the clock and data recovery, using the recovered clock and data signals to drive the transmitter of LCT SFP transceiver 42. The optical signal from the transmitter LCT SFP transceiver 42 is looped back to the receiver of LCT SFP transceiver 42 via optical connection 56. Optical connection 56 includes a pair of fiber connectors 52 and 54 which are optically coupled to each other and to the transmitter and receiver of the SFP transceiver 42 by respective optical fibers. Comparing the looped-back LCT receiver signal with the incoming signal (in SONET format) at the receiver of the DPS transceiver 44, the FFI device 240 performs the error correction algorithm for missing bits and/or any erroneous bits in the data stream. The corrected bit stream then goes through another clock and data recovery circuit to reshape the waveform in SONET OC-3 format to drive the transmitter of the DPS transceiver 44.

The LCT is designed in the FFI device to operate as the transmitting channel for free-space laser communication for a single atmospheric mitigation without the OCRA. Since the system disclosed herein uses a dual mitigation approach with the OCRA, the LCT is connected with a loop back fiber which facilitates the dual atmospheric mitigation (integration of the FFI device with the OCRA) without having to change the electrical hardware inside the FFI device.

Basically, the format of the electrical signals during forward error correction is in SONET format, i.e., the FFI device internally works with electrical signals in SONET format. The error correction process itself is manipulating the bit streams of the input and output signals. It should work with either SONET or other signal format, but the hardware for the FFI device is based on SONET. Therefore the error correction hardware is designed to interface with the SONET input and output formats.

The electronic circuitry on PCB 50 comprises the following: (a) a first clock and data recovery circuit 22 that processes the electrical signals output by the receiver of SFP transceiver 44 to recover a data bit stream from the incoming optical signals; (b) Interleaving electronics 24 which interleave data of the data bit stream; (c) forward error correction (FEC) electronics 26 which perform the first forward error correction function; (d) framing electronics 28 which organize the corrected data bit stream to form frames; and (e) a second clock and data recovery circuit 30 that processes the electrical signals output by the framing electronics 28 and sends those processed electrical signals to the transmitter of SFP transceiver 42. The transmitter and receiver of SFP transceiver 42 are optically coupled by optical connection 56. The electronic circuitry on PCB 50 further comprises the following: (f) a third clock and data recovery circuit 58 that processes the electrical signals output by the receiver of SFP transceiver 42 to recover a data bit stream from the optical signals; (g) de-interleaving electronics 60 which undo the interleaving; (h) FEC electronics 62 which perform the second forward error correction function (by performing the error correction twice, it assures high integrity on the corrected signal bit stream); (i) de-framing electronics 64 which undoes the framing; and (j) a fourth clock and data recovery circuit 66 that processes the electrical signals output by the de-framing electronics 66 and sends those processed electrical signals to the transmitter of SFP transceiver 44, which converts the error-corrected data bit stream into optical signals in SONET format.

Figure 6:
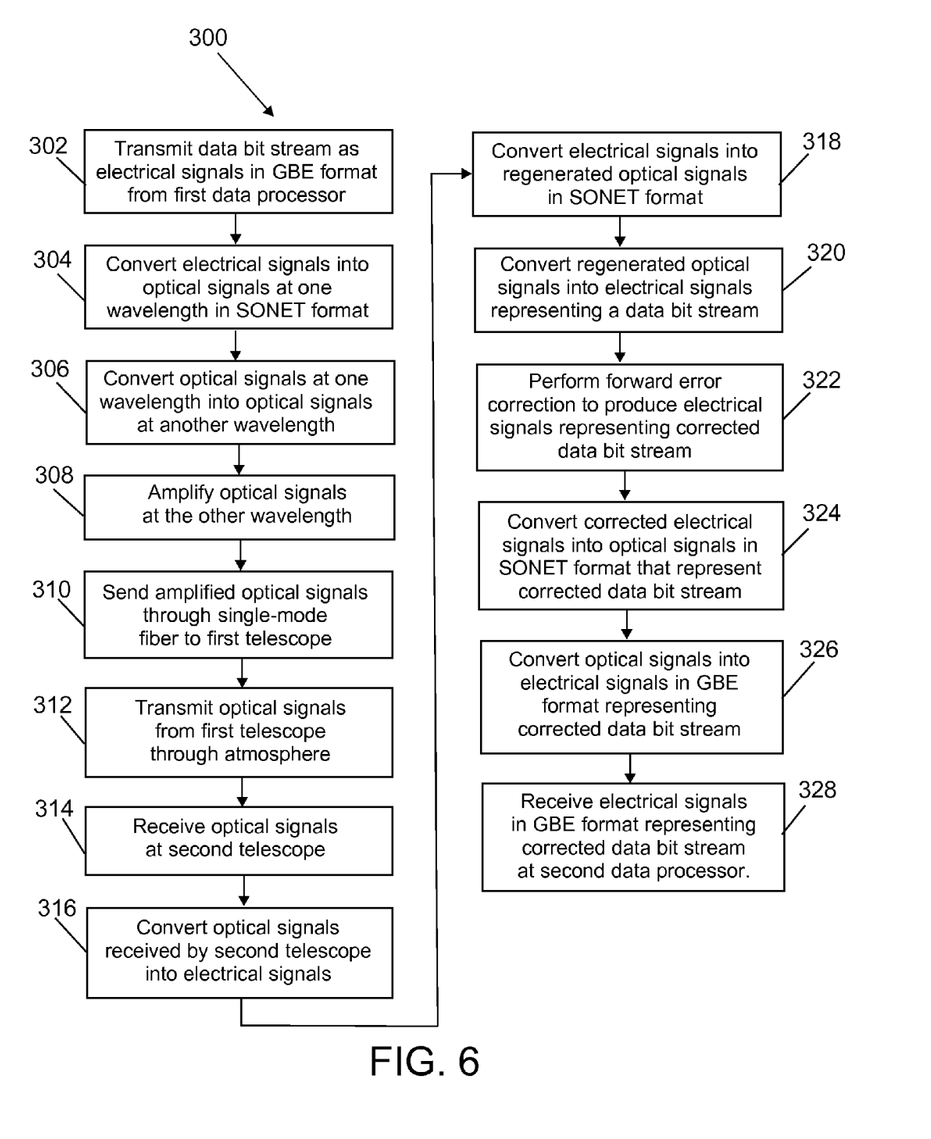
FIG. 6 is a flowchart showing a method for communicating data between data processors using optical signals that propagate through an atmosphere in accordance with one embodiment.

FIG. 6 is a flowchart showing a method 300 for communicating data between data processors using optical signals that propagate through an atmosphere. The method 300 in accordance with one embodiment comprises the following steps: transmitting a data bit stream in the form of electrical signals in GBE format from a first data processor (step 302); converting electrical signals in GBE format received from the first data processor into optical signals at one wavelength in SONET format (step 304); converting the optical signals at the one wavelength into optical signals at another wavelength (step 306); amplifying the optical signals at the other wavelength (step 308); sending the amplified optical signals through a single-mode fiber to a first telescope (step 310); transmitting the optical signals produced in step 310 from the first telescope through the atmosphere (step 312); receiving the optical signals transmitted by the first telescope at a second telescope (step 314); converting the optical signals received by the second telescope into electrical signals (step 316); (f) converting the electrical signals produced in step 316 into regenerated optical signals in SONET format (step 318); converting the regenerated optical signals into electrical signals representing a data bit stream (step 320); performing forward error correction on electrical signals produced in step 320 to produce electrical signals representing a corrected data bit stream (step 322); converting the electrical signals representing the corrected data bit stream into optical signals in SONET format to represent the corrected data bit stream (step 324); converting the optical signals produced in step 324 into electrical signals in GBE format representing the corrected data bit stream (step 326); and receiving the electrical signals in GBE format representing the corrected data bit stream at a second data processor (step 328).

In conclusion, the system described above employs a dual atmospheric effect mitigation methodology for a free-space bidirectional laser communication link for GBE telemetry data between an airplane and ground station. This system is a viable improvement to the approach using an RF link, which has a limitation in data rate growth and is susceptible to electromagnetic interference.

While free-space laser communication systems have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A system comprising:
an array of lenses;
an optical communications receiver array that is optically coupled to said array of lenses and configured to convert light impinging on said array of lenses into differential electrical signals;
a regenerator configured to convert the differential electrical signals into regenerated optical signals formatted in accordance with a specified networking protocol;
an error correction subsystem configured to convert the regenerated optical signals from said regenerator into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream;
a media converter configured to convert optical signals transmitted by the error correction subsystem into electrical signals in GBE format representing the corrected data bit stream; and
a data processor programmed to process electrical signals in GBE format received from said media converter.

2. The system as recited in claim 1, wherein the specified networking protocol is Synchronous Optical Networking.

3. The system as recited in claim 1, wherein said data processor is a telemetry processor that transmits Ethernet frames at a rate of at least one gigabit per second.

4. The system as recited in claim 1, further comprising a telescope configured to direct impinging free-space optical signals onto said array of lenses.

5. The system as recited in claim 4, wherein said data processor is further programmed to send electrical signals in GBE format representing a data bit stream to said media converter, and said media converter is further configured to convert the electrical signals received from said data processor into optical signals at one wavelength formatted in accordance with the specified networking protocol to represent the data bit stream, said system further comprising:
- a wavelength converter configured for converting optical signals received from said media converter at the one wavelength into optical signals at another wavelength;
- an optical amplifier for amplifying the optical signals at the other wavelength; and
- an optical connection which carries the amplified optical signals to said telescope.

6. The system as recited in claim 5, wherein the specified networking protocol is Synchronous Optical Networking.

7. The system as recited in claim 5, wherein said data processor is programmed to process telemetry data.

8. A communication system comprising:
- first and second telescopes;
- a first data processor programmed to transmit electrical signals in GBE format representing a data bit stream;
- a first media converter configured to convert electrical signals in GBE format received from said first data processor into optical signals at one wavelength formatted in accordance with a specified networking protocol to represent the transmitted data bit stream;
- a wavelength converter configured for converting optical signals received from said first media converter at the one wavelength into optical signals at another wavelength;
- an optical amplifier for amplifying the optical signals at the other wavelength;
- an optical connection which carries the amplified optical signals to said first telescope;
- a first array of lenses located to receive light from said second telescope;
- a first optical communications receiver array that is optically coupled to said first array of lenses and configured to convert light impinging on said first array of lenses into differential electrical signals;
- a first regenerator configured to convert the differential electrical signals into regenerated optical signals formatted in accordance with the specified networking protocol;
- a first error correction subsystem configured to convert the regenerated optical signals from said first regenerator into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream;
- a second media converter configured to convert the corrected optical signals from said first error correction subsystem into electrical signals in GBE format representing the corrected data bit stream; and
- a second data processor programmed to process electrical signals in GBE format received from said second media converter.

9. The communication system as recited in claim 8, wherein said first telescope, said first data processor, and said first media converter are disposed on one of a mobile platform and a ground station, while said second telescope, said second data processor, and said second media converter are disposed on the other of said mobile platform and said ground station.

10. The communication system as recited in claim 8, wherein the specified networking protocol is Synchronous Optical Networking.

11. The communication system as recited in claim 10, wherein each of the first and second data processors is a respective telemetry processor capable of transmitting and receiving Ethernet frames at a rate of at least one gigabit per second.

12. The communication system as recited in claim 9, further comprising:
- a second array of lenses located to receive light from said first telescope;
- a second optical communications receiver array that is optically coupled to said second array of lenses and configured to convert light impinging on said second array of lenses into differential electrical signals;
- a second regenerator configured to convert the differential electrical signals from said second optical communications receiver array into regenerated optical signals formatted in accordance with the specified networking protocol; and
- a second error correction subsystem configured to convert the regenerated optical signals from said second regenerator into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream;
- wherein said first media converter is configured to convert the corrected optical signals from said second error correction subsystem into electrical signals in GBE format representing the corrected data bit stream.

13. The communication system as recited in claim 12, further comprising:
- a first bandpass filter placed between said first telescope and said second array of lenses and having a center at a first wavelength; and
- a second bandpass filter placed between said second telescope and said first array of lenses and having a center at a second wavelength different than said first wavelength.

14. A system comprising:
- a telescope;
- a plurality of lenses arranged to receive optical signals from said telescope;
- a plurality of photodetectors for converting optical signals received by said lenses into electrical signals;
- electronic circuitry configured to convert the electrical signals from said photodetectors into regenerated optical signals formatted in accordance with a specified networking protocol;

an error correction subsystem configured to convert the regenerated optical signals into electrical signals representing a data bit stream, perform forward error correction on the electrical signals representing a data bit stream to produce electrical signals representing a corrected data bit stream, and converting the electrical signals representing the corrected data bit stream into optical signals formatted in accordance with the specified networking protocol to represent the corrected data bit stream;

a media converter configured to convert the corrected optical signals into electrical signals in GBE format representing the corrected data bit stream; and a data processor programmed to process electrical signals in GBE format received from said media converter.

15. The system as recited in claim 14, wherein the specified networking protocol is Synchronous Optical Networking.

16. The system as recited in claim 14, wherein said data processor is a telemetry processor that transmits Ethernet frames at a rate of at least one gigabit per second.

17. The system as recited in claim 16, wherein said data processor is further programmed to send electrical signals in GBE format representing a data bit stream to said media converter, and said media converter is further configured to convert the electrical signals received from said data processor into optical signals at one wavelength formatted in accordance with the specified networking protocol, said system further comprising:

a wavelength converter configured for converting optical signals received from said media converter at the one wavelength into optical signals at another wavelength;

an optical amplifier for amplifying the optical signals at the other wavelength; and an optical connection which carries the amplified optical signals to said telescope.

18. A method for communicating data between data processors using optical signals that propagate through an atmosphere, comprising:

(a) transmitting a data bit stream in the form of electrical signals in GBE format from a first data processor;

(b) converting the electrical signals in GBE format received from the first data processor into optical signals formatted in accordance with a specified networking protocol to represent the transmitted data bit stream;

(c) transmitting the optical signals produced in step (b) from a first telescope through the atmosphere;

(d) receiving the optical signals transmitted by the first telescope at a second telescope;

(e) converting the optical signals received by the second telescope into electrical signals;

(f) converting the electrical signals produced in step (e) into regenerated optical signals formatted in accordance with the specified networking protocol;

(g) converting the regenerated optical signals into electrical signals representing a data bit stream;

(h) performing forward error correction on electrical signals produced in step (g) to produce electrical signals representing a corrected data bit stream;

(i) converting the electrical signals representing the corrected data bit stream into optical signals formatted in accordance with the specified networking protocol to represent the corrected data bit stream;

(j) converting the optical signals produced in step (i) into electrical signals in GBE format representing the corrected data bit stream; and (k) receiving the electrical signals in GBE format representing the corrected data bit stream at a second data processor.

19. The method as recited in claim 18, wherein step (b) comprises:

converting electrical signals in GBE format received from the first data processor into optical signals at one wavelength formatted in accordance with the specified networking protocol;

converting the optical signals at the one wavelength into optical signals at another wavelength;

amplifying the optical signals at the other wavelength; and sending the amplified optical signals through a single-mode fiber to the first telescope.

20. The method as recited in claim 18, wherein the specified networking protocol is Synchronous Optical Networking, and each of the first and second data processors is a respective telemetry processor capable of transmitting and receiving Ethernet frames at a rate of at least one gigabit per second.

* * * * *